(12) United States Patent
Pennisi et al.

(10) Patent No.: US 9,480,132 B2
(45) Date of Patent: Oct. 25, 2016

(54) SAFETY DEVICE FOR A STREET LAMP SYSTEM

(71) Applicant: SPI TECNO S.R.L., L'Aquila (IT)

(72) Inventors: Dario Pennisi, Fiumicino (IT); Berardino De Angelis, Gignano (IT)

(73) Assignee: SPI TECNO S.R.L., L'Aquila (IT)

( * ) Notice: Subject to any disclaimer, the term of this patent is extended or adjusted under 35 U.S.C. 154(b) by 0 days.

(21) Appl. No.: 14/788,077

(22) Filed: Jun. 30, 2015

(65) Prior Publication Data

US 2015/0312996 A1     Oct. 29, 2015

Related U.S. Application Data

(62) Division of application No. 13/634,423, filed as application No. PCT/IB2011/051065 on Mar. 14, 2011, now Pat. No. 9,101,004.

(30) Foreign Application Priority Data

Mar. 15, 2010  (IT) .............................. MI2010A0417

(51) Int. Cl.
  *H05B 37/03*     (2006.01)
  *H02J 3/38*      (2006.01)
  (Continued)

(52) U.S. Cl.
  CPC ............... *H05B 37/03* (2013.01); *H02J 3/383* (2013.01); *F21S 9/03* (2013.01); *F21S 9/04* (2013.01); *F21V 23/04* (2013.01); *F21W 2131/103* (2013.01); *Y02E 10/563* (2013.01)

(58) Field of Classification Search
  CPC ......... H02J 3/383; H02J 3/385; Y02E 10/50; H01L 31/02021

USPC ............................ 307/82, 43, 45, 80, 85, 86
See application file for complete search history.

(56) References Cited

U.S. PATENT DOCUMENTS 6,111,767 A     8/2000  Handleman
2003/0037813 A1   2/2003  Jansen
(Continued)

FOREIGN PATENT DOCUMENTS

CN    101107442 A    1/2008
DE    2 388 974 A    11/2003
(Continued)

OTHER PUBLICATIONS

Written Opinion dated Jun. 8, 2011 issued in PCT Application No. PCT/IB2011/051065, filed Mar. 14, 2011.
(Continued)

*Primary Examiner* — Tuyet Vo
(74) *Attorney, Agent, or Firm* — Workman Nydegger (57) ABSTRACT

A safety device for use in a street lamp, includes a first connection to a power grid (5), second connections to at least two external units (3,4), a first unit (3) of at least two units being adapted to draw current and a second unit (4) of at least two units being adapted to generate a potential difference. The safety device further includes a switch (6) adapted to switch between a first position, in which the first unit (3) is connected to the power line (5) to draw current from the power line, and a second position, in which the second unit (4) is connected to the power line to apply the potential difference to wires of the power line. The safety device further includes a communication system adapted to detect the presence of a safety signal on the power line and to switch the switch (6) to the first position in the event that the safety signal is missing or faulty.

15 Claims, 3 Drawing Sheets (51) Int. Cl.
*F21S 9/03* (2006.01)
*F21S 9/04* (2006.01)
*F21V 23/04* (2006.01)
*F21W 131/103* (2006.01)

(56) References Cited

U.S. PATENT DOCUMENTS

| | | |
|---|---|---|
| 2003/0047209 A1 | 3/2003 | Yanai et al. |
| 2007/0236187 A1 | 10/2007 | Wai et al. |
| 2008/0078436 A1 | 4/2008 | Nachamkin et al. |
| 2008/0137327 A1 | 6/2008 | Hodulik |
| 2009/0088991 A1* | 4/2009 | Brzezowski ............. G01D 4/00 702/62 |
| 2009/0146423 A1 | 6/2009 | Arinaga |
| 2011/0062787 A1* | 3/2011 | Pan ......................... H02J 7/35 307/86 |
| 2011/0090089 A1 | 4/2011 | Luo |
| 2011/0224839 A1 | 9/2011 | Thompson |
| 2011/0273129 A1 | 11/2011 | Coe et al. |
| 2012/0170336 A1 | 7/2012 | Chang et al. |
| 2013/0099760 A1 | 4/2013 | Shizuya et al. |
| 2016/0028271 A1* | 1/2016 | Smith ..................... H02J 50/40 320/101 |

FOREIGN PATENT DOCUMENTS

| | | |
|---|---|---|
| DE | 10 2007 041 842 | 3/2009 |
| GB | 2 449 102 A | 11/2008 |
| TW | 591847 B | 6/2004 |
| TW | I296457 B | 5/2008 |

OTHER PUBLICATIONS

International Search Report dated Jun. 8, 2011 issued in PCT Application No. PCT/IB2011/051065, filed Mar. 14, 2011.
International Preliminary Report dated Feb. 24, 2012, issued in PCT Application No. PCT/IB2011/051065, filed Mar. 14, 2011.
Taiwan Search Report dated Apr. 19, 2013, issued in TW Application No. 100108674, filed Mar. 15, 2011.

* cited by examiner

SAFETY DEVICE FOR A STREET LAMP SYSTEM

CROSS-REFERENCE TO RELATED APPLICATIONS

This application is a divisional of U.S. application Ser. No. 13/634,423, filed Oct. 1, 2012, which claims priority to PCT Application No. PCT/IB2011/051065, filed Mar. 14, 2011, which claims priority to Italian Application No. MI2010A000417, filed Mar. 15, 2010, which are incorporated herein by specific reference.

TECHNICAL FIELD

The present invention relates to device for use in a street lamp, in particular a safety device for public lighting systems, such as those including solar panels, aeolian generators or voltage generators in general, for collecting energy to be supplied to the power grid.

The invention specifically relates to devices according to the preamble of claim 1.

PRIOR ART

Public lighting systems are known wherein a plurality of street lamps are fitted with discharge lamps powered through a single-phase or three-phase alternating current line.

The voltage of this line is regulated by a voltage regulator which, being arranged upstream of the line, draws a voltage from an electric power distribution grid.

Aiming at reducing both the environmental impact and the running costs, different solutions have been proposed which incorporate solar panels or aeolian generators for the purpose of collecting energy in a distributed manner, to be used locally by means of accumulators or to be supplied to the power grid by means of inverters.

Some of these solutions also utilise LED lamps in order to reduce the electric consumption.

Patent application US2008/0137327A1 discloses that street lamps may be fitted with LED lamps and solar panels. For energy collection, US2008/0137327 proposes two different solutions: one embodiment uses one inverter per street lamp to convert the solar panel's direct voltage output into an alternating current which is supplied to the power grid; in another embodiment, the street lamps are connected to a direct current bus that connects them to an inverter which then supplies an alternating current to the grid. The solutions disclosed in US2008/0137327 require a very high product cost in the former case and, in the latter case, a subdivision of the lighting system into different zones, the installation of one inverter per zone, and a dedicated direct current wiring between the posts of each zone.

British patent application GB 2388974 A discloses a system wherein each street lamp is fitted with an inverter and is provided with a switching system that disables the inverter when it can no longer supply energy to the alternating grid; such a switching system automatically turns the lamp on only when the energy collected by the solar panel drops below a predetermined threshold. In the solution known from GB2388974, the inverter is equipped with an RS485 interface for transmitting to a monitoring system the power of the energy supplied to the grid, the internal temperature of the inverter, the RMS value of the current supplied to the grid, and the solar panel's DC voltage output readings. This system has the drawback that the street lamps may be powered on at different times. Moreover, this system has the drawback that it requires one inverter for each post and an RS485 serial communication system that requires a dedicated wiring.

Patent application GB2449102A discloses how to re-use the existing wirings to connect groups of street lamps into a low-voltage DC network (48V) leading to a single inverter that connects the low-voltage network to the AC power grid. The street lamps are equipped with solar panels or wind turbines supplying current to the low-voltage network, and make use of LED lamps. Also, the street lamps may be fitted with a wi-fi antenna for transmitting data through a modem connected to the low-voltage network on one side and to an Internet connection on the other side. This system appears to be efficient when all the street lamps connected to the low-voltage network are handled as a single group, but becomes inefficient if they have to be divided into subgroups to be controlled separately; in this latter case, in fact, one inverter per subgroup will be needed.

US2008/0137327, GB 2449102 and GB 2388974 all suffer from the drawback that no safety measures are taken in the event that the line is damaged, so that the system is subject to the risk of fire and the service personnel is subject to the risk of being harmed by electricity.

Document DE 10 2007 041 842 A1 relates to public lighting system comprising a lamp and a solar cell, and a switch that alternately connects either the lamp or the solar cell.

Document US 2003/0037813 A1 relates to system for converting sunlight to artificial light, wherein solar energy is converted in DC power to the power mains, wherein the system comprises a bidirectional AC/DC or DC/AC converter.

It is therefore apparent that there is a need for public lighting systems which are safe and which allow to efficiently supply energy (produced by auxiliary generators such as solar panels or wind turbines) to the power grid.

OBJECTS AND BRIEF DESCRIPTION OF THE INVENTION

It is one object of the present invention to overcome some drawbacks of prior-art public lighting systems.

In particular, it is one object of the present invention to provide a safety device for use in a street lamp, in particular for public lighting system which allows clean energy, e.g., energy produced by solar panels or wind turbines, to be collected and supplied to the power grid.

It is another object of the present invention to provide a safety device for use in a street lamp, in particular for street lighting systems which allows the existing lighting systems to be easily and economically upgraded to ensure higher energetic efficiency.

It is another object of the present invention to provide a safety device for use in a street lamp, in particular for a public lighting system which will remain safe in the event that the power grid which supplies it incurs into damage.

These and other objects of the present invention are achieved through a device for use in a street lamp, incorporating the features set out in the appended claims, which are intended as an integral part of the present description.

The invention relates to a device for use in a street lamp, which comprises:
first means for connecting to a power grid;
second means for connecting to at least two external units, a first one of said two units being adapted to draw current and a second one of said two units being adapted to generate a potential difference;

a switch adapted to switch between
  a first position, in which said first unit is connected to said power line to draw current from said power line, and
  a second position, in which said second unit is connected to said power line to apply said potential difference to wires of said power line;
a communication system adapted to detect the presence of a safety signal on said power line and to switch said switch to said first position in the event that said safety signal is missing or faulty.

Such a device may be integrated into a lamp post.

Further advantageous features are defined in the dependent claims.

The inventors have also conceived an efficient system that allows re-using the existing wirings of a public lighting system.

The preferred public lighting system comprises at least one street lamp of the type comprising a lighting device, a device (hereafter also referred to as converter) for converting renewable energy into electric energy (e.g., a solar panel or an aeolian generator), and a post switch for alternately connecting either the lamp or the generator to a power line. This power line may be, for example, the one normally connecting the transformer room (which draws and stabilises the voltage taken from the grid) to the street lamps.

While at daytime the street lamps are off, the post switch switches to a position that allows the renewable energy converter to be connected to the power line, so that the collected energy can be supplied to the grid. In the evening, on the contrary, the post switch connects the lamp to the power line to draw current and supply power to the lamp.

The lighting system also comprises a line switch switching between a first position, in which the line is connected to a power grid, and a second position, in which the power line is connected to an inverter (i.e., a DC/AC converter) interposed between the line switch and the power grid.

During daytime, the line switch connects the line to the inverter, so that the direct current generated by the generators arranged on the street lamps is converted into alternating current and supplied to the grid.

In the evening, the line switch connects the line directly to the grid, thus allowing the street lamps to be powered.

This solution, which is alternative to those known in the art, allows to effectively re-use the existing wirings without requiring costly work, e.g., for placing the street lamps into a DC bus as per GB 2449102 or US2008/0137327.

For example, one wire laid between the room and the street lamps is used for transmitting a safety signal, whose absence or interruption causes the post switches to disconnect the renewable energy converter in order to prevent fires or other dangerous situations.

Said signal may, for example, be transmitted through conveyed waves in the case of a single-phase wiring, or by means of a dedicated wire in the case of a three-phase wiring, and may also be used as a synchronism signal to set the street lamps' on time.

For example, each street lamp is fitted with a current generator and a DC/DC stabiliser which allow the current supplied to the grid by the street lamp to be regulated in such a way as to maximise the power transfer from the renewable energy converters to the grid.

Preferably, if the line is not a single-phase one, and therefore comprises at least three conducting wires, then the post switches can be configured in a manner such that it is possible to use any one phase pair to supply power to the lamp, so as to obtain a correct load balance. This solution allows to improve the energy transfer from the grid to the street lamps. These phases are preferably selected manually by an operator when installing the system, but the post switches may also be controlled remotely to connect the lamp to one remotely selected phase pair.

Further objects and advantages of the present invention will become more apparent from the following description of a few embodiments thereof, which are supplied by way of non-limiting example.

BRIEF DESCRIPTION OF THE DRAWINGS

Some preferred and advantageous embodiments will now be described by way of non-limiting example with reference to the annexed drawings, wherein.

The drawings show different aspects and embodiments of the present invention and, where appropriate, similar structures, components, materials and/or elements in the various drawings are designated by similar reference numerals.

DETAILED DESCRIPTION OF THE INVENTION

Figure 1:
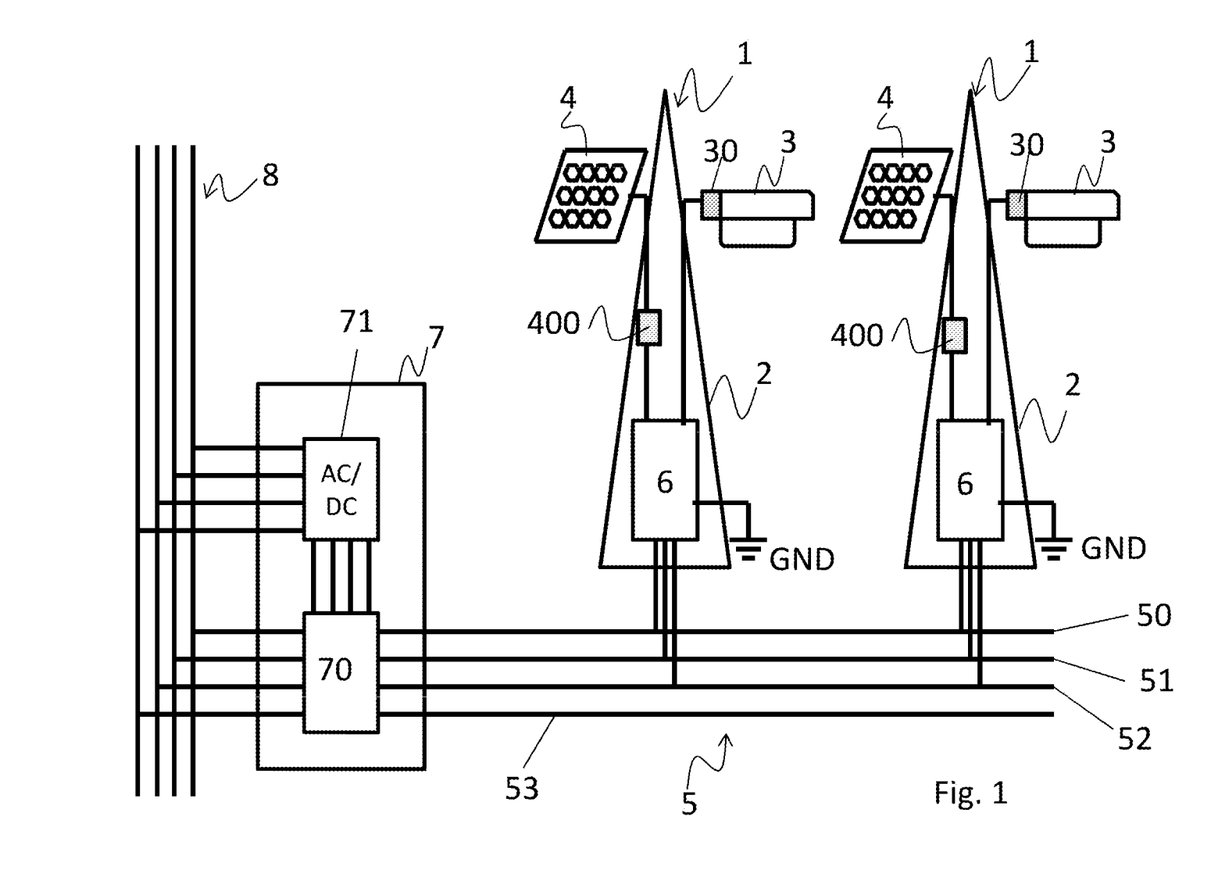
FIG. 1 shows a public lighting system.

FIG. 1 schematically shows a public lighting system according to an example.

The system of FIG. 1 comprises a group of street lamps 1, each comprising a post 2 on which a lamp 3 and a solar panel 4 are fitted.

In the following description, the term "lamp" will refer to any lighting device capable of generating a luminous flux. For the purposes of the present invention, the lamp may be, for example, an incandescent lamp, a discharge lamp, an arc lamp, a neon lamp, a LED (Light Emitting Diode) lamp, an OLED (Organic LED) lamp, etc.

In the example of FIG. 1, the lamp is a low-consumption LED lamp that needs direct current power. Since in the example of FIG. 1 the lamps are powered by an alternating current (AC) power line 5, the lamp 3 is fitted with an AC/DC rectifier 30 which allows it to be connected to an alternating current line.

The solar panel 4 of FIG. 1 is of the photovoltaic type and includes a plurality of cells which transform the photons of solar radiation into electric energy. The panel therefore outputs a direct voltage, the value of which depends on the quantity of energy collected.

Preferably, the posts of the street lamps 1 are fitted with solar panels 4 having an area of approx. 0.5 m2, with an estimated power output of approx. 80 W.

The solar panel and the lamp are connected to the power line 5 through a post switch 6 that alternately connects either the solar panel 4 or the lamp 3 to the line 5.

For example, the post switch 6 provides the possibility of balancing the load on the line 5 by connecting the lamp to a selectable combination of two wires of the line 5.

The latter may be a single-phase or multi-phase line.

In the case of a single-phase line, the post switch 6 always connects the lamp 3 to the phase and neutral wires of the single-phase line, without offering any other options.

In the case of a multi-phase line, e.g., a three-phase line, the post switch may select any pair of phases among those available in order to balance the load on the line. To do so, a communication system is provided among the post switches to allow selecting the switch to be switched should any unbalance arise.

In an example, which is simpler and less expensive, the post switches are configured at installation time in a manner such as to always connect the lamp to the same phase pair. At installation or maintenance time, the installer (or service technician) will configure the various post switches in such a way as to obtain a balanced load.

In the example of FIG. 1, the line 5 is a three-phase line and therefore comprises three phases (50, 51 and 52) and one optional ground line (53).

In this example, the three phases are brought into the post to be connected to the post switch 6, whereas the ground for the lamp 3 or the panel 4 is taken locally, for example, from the post body. As an alternative, the ground line may also be taken from the line 5.

The lamp 3 requires a single-phase supply and therefore, as aforementioned, it is only connected to one pair of the phases 50, 51 and 52 of the line 5.

The line 5 is then connected to a line switch 70 that, in the non-limiting example of FIG. 1, in arranged inside the transformer room 7.

The line switch 70 allows the line 5 (whether single-phase or three-phase) to be connected directly to the power distribution grid 8 (typically a 220-230V RMS AC grid) or to be connected to the grid 8 through the inverter 71.

In one example, inside the transformer room there may be suitable transformation means adapted to supply the line 5 with a voltage which is variable as a function of centralised control policies for the group of street lamps involved. For example, depending on measured atmospheric and light conditions (e.g., detected by means of a night sensor), the mean voltage (RMS, Root Mean Square) supplied to the line 5 can be regulated in order to adjust the luminous flux of the lamp 3.

These transformation means are preferably interposed between the grid 8 and one input of the transformer room 7; in this case, which is not shown in FIG. 1, the line switch 70 and the inverter 71 are connected to the transformation means, which in turn are connected to the distribution grid 8.

Though not shown in FIG. 1, the public lighting system according to the present invention may comprise additional groups of street lamps associated with respective power lines and transformer rooms as previously described with reference to the group of street lamps of FIG. 1.

In one example, the solar panel 4 is connected directly (through the contacts of the switch 6) to the power line 5.

Figure 2:
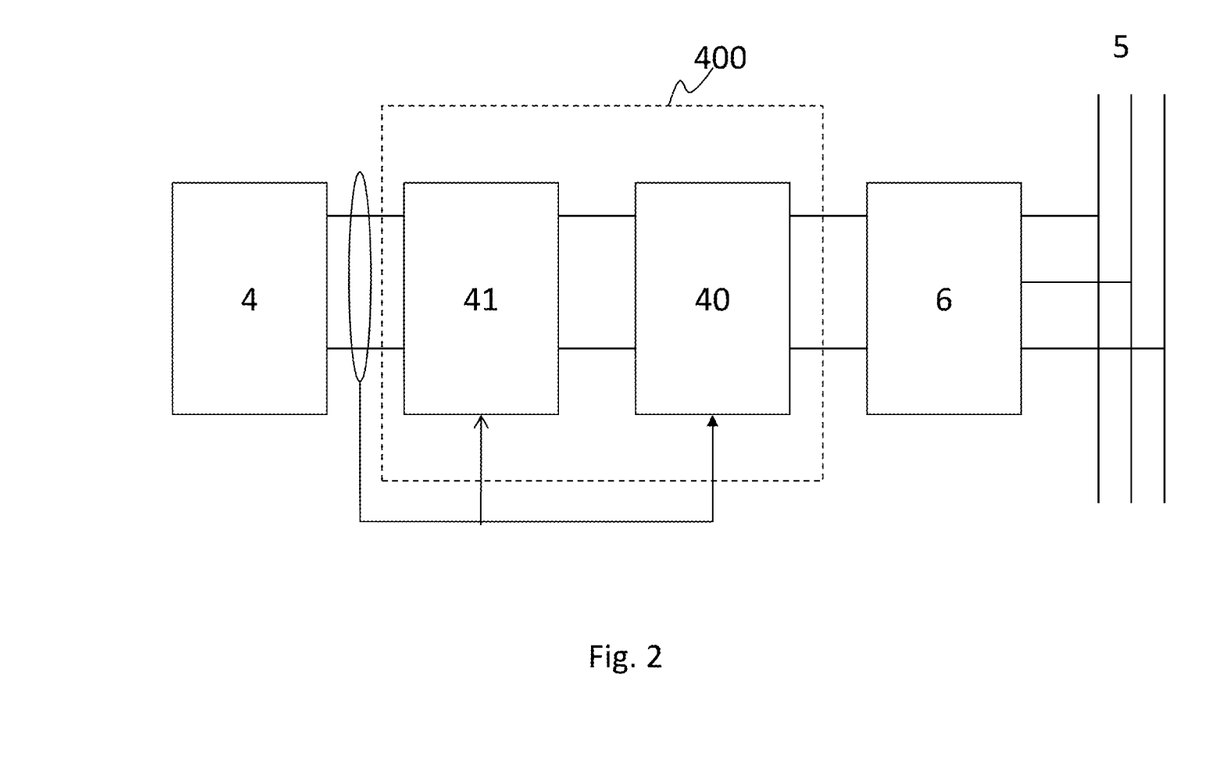
FIG. 2 is a block diagram showing the connection of a solar panel to the power grid in a public lighting system.

However, this solution does not allow to optimise the energy transfer from the solar panel to the grid; therefore, in a preferred example a module 400 comprising a current generator and a voltage stabiliser, described below with reference to FIG. 2, is connected to the output of the solar panel.

The voltage on the power line 5 is determined by the current contribution of the various street lamps and by the load connected to the line; when the street lamps are supplying current to the line, the load substantially consists of the inverter 71, which allows the energy collected by the solar panels 4 to be supplied to the power grid 8.

The inverter 71 is an active device which adapts its own input impedance in order to optimise the energy transfer from the line 5 to the power grid 8; for example, this is achieved by tentatively varying the input impedance, measuring the input and output power, and verifying if the impedance change has led to power transfer improvements. The inverter 71 maximises the power transfer to the grid for input direct voltages within a certain range of optimum voltages (V1$_{ott}$-V2$_{ott}$), e.g., between 400V and 600V. For the purposes of the present invention, optimum voltages are voltages wherein the inverter's transfer efficiency (meaning the ratio between output power and input power) is greater than or equal to 90% of the inverter's maximum efficiency.

The generator 40 detects, through suitable voltage and current sensors (generically represented by the branch 42), the power available at the output of the solar panel 4 and regulates the generated current accordingly.

In particular, after a start-up transient the generated current will be:

$$I_{OUT}=P_{disp}/V_{line}$$

where $I_{OUT}$ is the current generated by the generator 40, $P_{disp}$ is the power supplied by the solar panel, and $V_{line}$ is the actual line voltage.

The current $I_{out}$ outputted by all the generators 40 of the various street lamps 1 is supplied to the line 5 and arrives at the inverter 71, which, as aforementioned, will tend to modify its own input impedance to bring the line voltage $V_{line}$ to an optimum value $V_{line-ott}$ within the voltage range ($V_{1ott}$-$V_{2ott}$) that optimises the energy transfer to the grid.

In order to allow the generator 40 to operate properly, the DC/DC stabiliser 41 raises its own output voltage up to a voltage value corresponding to the expected value of the line voltage, i.e., the value $V_{line-ott}$ towards which the inverter 71 will tend. Since $V_{line-ott}$ cannot be precisely defined at the design stage, in one example the DC/DC stabiliser supplies to the input of the current generator 40 a predefined direct voltage comprised between $V_{1ott}$ and $V_{2ott}$, preferably equal to $V_{2ott}$. Alternatively, the stabiliser 41 may also detect the line voltage and adapt its own output to the line voltage.

The DC/DC stabiliser 41 may be of various types; for example, it may comprise a booster transformer or an integrated-circuit stabiliser. The DC/DC stabiliser and the current generator 40 may be integrated into the solar panel or be connected to the latter's output.

In the example shown in FIG. 2, the stabiliser 41 detects the voltages and currents supplied by the solar panel 4 and adapts its own input impedance so as to optimise the power transfer to the current generator 40. In particular, the stabiliser 41 is equipped with a control system which, by executing an MPPT (Maximum Power Point Track) algorithm, changes the stabiliser's input impedance in order to maximise the solar panel's output power.

During daytime operation, when the lamps 3 are off, the lighting system allows energy to be collected in a distributed manner through the solar panels 4.

The post switches 6 are controlled in a manner such as to connect the outputs of the current generators of the solar panels 4 to the wires of the power line 5, which is thus used in DC mode. In particular, if the line 5 is a three-phase line, it comprises a larger number of wires than necessary for carrying a direct voltage. Preferably, all solar panels 4 of the street lamps 1 are consistently connected to the same pair of wires of the line 5, thus being connected in parallel.

As an alternative, it is possible to exploit all three wires of the three-phase line: one of the three wires is used as a reference, so that all the negative poles of the solar panels' outputs are connected to this wire, whereas the opposite-sign poles are alternately connected to the other two line wires. Instead of using two inverters to supply the collected energy to the grid, the line switch 70 is modified in a manner such that, when it must connect the line 5 to the inverter 71, it does so by short-circuiting the two positive wires; this may be accomplished, for example, by using SCR switches or relays. This solution appears to be advantageous when there are many street lamps supplying current to the same power line 5. In this case, in fact, currents may reach high values and it may be appropriate and preferable to distribute the collected energy over as many wires as possible. In this example, therefore, the post switch 6 selects the wires of the line 5 to which the DC/DC stabiliser's output voltage must be applied depending on a number of measurements taken on the wires themselves, in particular depending on the current circulating in the line. In this example, the wire used as a reference may be sized for greater currents than the other wires.

Regardless of whether two or three wires are used, in this energy collection step the line switch 70 is switched to a position in which it connects the line 5 to the inverter 71, which transforms the direct currents produced by the street lamps 1 into alternating currents to be supplied to the grid 8 after phase synchronisation with the currents that are present on the grid 8.

In the evening, when the lamps 3 are turned on to illuminate streets or other public places, the post switches 6 are so controlled as to connect the lamps 3 to a phase of the line 5 which is specifically selected in order to reduce the load unbalance seen by the line 5. As aforementioned, the selection may take place dynamically or it may be preset when installing the street lamps.

In the evening the line switch 70 is switched to a position that allows current to be drawn from the grid 8. In this position, the line 5 is run by an alternating current (AC) reaching the lamps 3, which, if required, may be fitted with a suitable AC/DC rectifier, as previously explained with reference to the example of FIG. 1.

The advantages of the present solution are apparent from the above description.

The system uses a single inverter for each group of street lamps, and the distribution line can be alternatively operated in DC or AC, depending on the required utilisation (energy supplied to the grid or energy drawn from the grid). Thus the wirings normally existing between the transformer room and the street lamps can be fully re-used.

Furthermore, the architecture of this public lighting system allows to implement, in a simple manner, a safety system which intervenes in the event that the power line gets damaged.

In a preferred embodiment, such a safety system is implemented through a safety device (preferably built in or associated with the line switch 70), which generates a safety signal that is transmitted to each street lamp 1 through one or more wires of the power line 5.

Each street lamp 1 is thus equipped with a respective control system that verifies the presence of the safety signal on the line 5 and disconnects the solar panels 4 should the signal be missing or faulty. In this way, in the event that the line should suffer any damage during the day, the solar panels will be disconnected, so that voltage will be removed from the line and any people or objects getting in contact with the damaged line will be safe.

In one embodiment, if the line is a three-phase line, the post switches 6 connect the solar panels 4 to two predetermined line phases, e.g., the phases 50 and 51 of FIG. 1. Across these two phases there will thus be a potential difference dependent on line resistance and on the current generated by the current generators 40 fitted to the various street lamps connected to the line 5.

The third phase of the three-phase line (phase 52 in the above example) is dedicated to the transmission of the safety signal. Said signal may be an alternating current signal or, more preferably, a direct voltage signal, the absence of which is interpreted by the post switches 6 as a line fault which must be followed by the action of disconnecting the solar panels 4.

In one embodiment, the safety signal is also used as a synchronism signal for turning on the lamps 3. When it is time to turn on the lamp, the line communication system interrupts the transmission of the safety signal, so that the post switches 6 will switch to the position that disconnects the solar panels and connects the lamps to the power line.

The line switch behaves differently depending on whether the interruption of the safety signal is due to a failure or to an event set beforehand (e.g., lamp on time).

In the event of a failure, it remains in the position that connects the line to the inverter 71, so that there will be no voltage on the line.

In the case of an event set beforehand, the line switch 70 is moved to the position in which it allows drawing current from the grid 8, so that power can be supplied to the street lamps.

In order to detect any line faults, the line switch 70 is fitted with suitable measuring instruments, such as a current detector, through which it can detect any anomalous conditions, such as null current or short circuit.

In one embodiment, the wire 52 (not engaged in the transmission of the DC current generated by the solar panels) is used as a data bus, thus providing bidirectional communication between the post switches 6 and a line switch 70. More in general, bidirectional communication takes place between a line communication system (associated with or integrated into the line switch 70) and post communication systems provided in each street lamp 1 and preferably integrated into the post switch.

Said bidirectional communication allows the street lamps 1 to inform the line switch 70 (or the line communication system associated therewith) about the state of the street lamp's components, such as, for example, the lamps 3, the solar panels 4 and the post switches 6. Vice versa, the line switch 70 can send a synchronism signal to the street lamps to allow the post switches to be switched from a position wherein the street lamps 1 supply energy to the line 5 and another position wherein they absorb energy.

Preferably, the line communication system allows the network of street lamps 1 to interface with external networks, e.g., in order to allow the switch 70 or the street lamps 1 to communicate with a remote service centre (not shown in the drawing), so as to allow for (preventive) maintenance of the public lighting system. Said communication system may comprise, for example, a device for connecting to the remote service centre through the Internet. Such a device may be a modem or a router (or in general any gateway) and may provide a wireless or wired connection; for example, it may be a Wi-Fi access point or a conveyed-wave modem that communicates with the remote server through the distribution grid 8.

In one embodiment, the communication bus between the street lamps and the transformer room is also used for applications other than public lighting. For instance, the street lamps may be equipped with a plurality of devices, such as video cameras, antennas (e.g., radio coverage of a data or telephony network), displays (for displaying advertisements or traffic information), meteorological detection systems, etc., which may receive and/or send information from/to remote service centres appropriately connected thereto through the above-described communication system.

Figure 3:
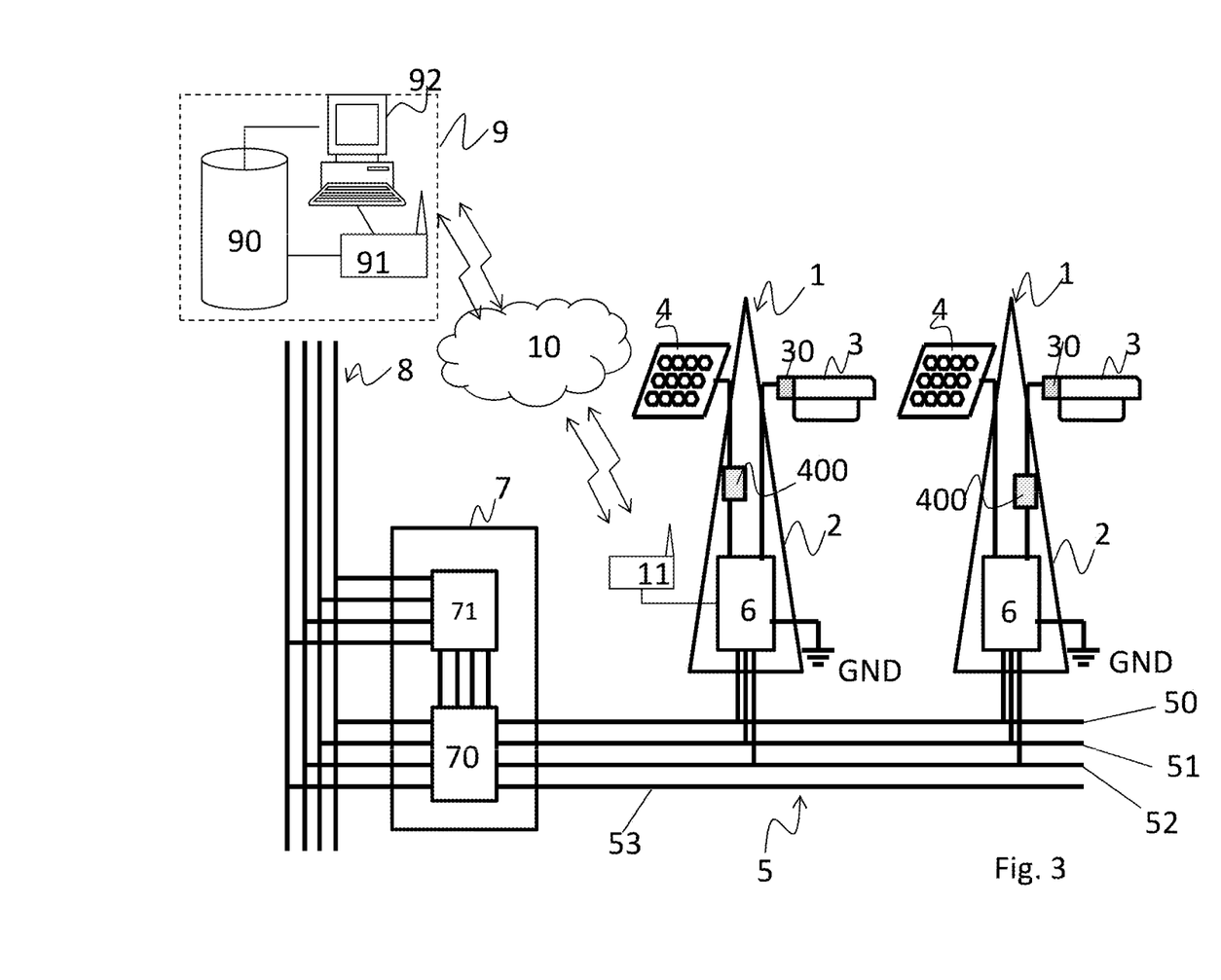
FIG. 3 shows a variant of the system of FIG. 1.

In the example of FIG. 3, the remote service centre is designated as a whole by reference numeral 9 and comprises a database 90, a gateway 91 and suitable processing and control means 92 (e.g., a personal computer) in communication with the database 90 and with the gateway 91 for processing and transmitting to the street lamps the data contained in the database 90 or for processing data received from the street lamps and entering it into the database 90.

In the example of FIG. 3, the gateway 91 provides a connection between a service centre's private network (e.g., a LAN) and a public network 10 (e.g., a UMTS or GPRS or EDGE or LTE mobile telephony network). Through this gateway, the service centre can send and receive the aforementioned data, which is received/sent by the router 11 connected to the network of street lamps 1.

The router 11 is preferably connected to or integrated with the post switch 6 as shown in FIG. 3, so as to reduce the number of wirings required for its installation.

The router 11 receives the data from the service centre 9 and sends it to the street lamps 1 via conveyed waves or other means as previously described with reference to communication between the line switch and the post switches. In the example of FIG. 3 the router 11 is mounted on a street lamp, but, as aforementioned, it could be installed at line switch level as well.

It is apparent from the above description that many variations may be made by a man skilled in the art wanting to create a lighting system in accordance with the teachings of the present invention as set out in the appended claims.

In particular, it being understood that the system is configured with a line switch, a central inverter and multiple post switches, in addition to or as a replacement for the solar panels 4 each street lamp may be fitted with different types of devices which allow renewable energy to be converted into electric energy. For example, such panels may be replaced with a wind turbine, concentrated solar power systems (CSP) or another system adapted to convert renewable energy into electric energy that can be supplied to the power grid.

For the purposes of the present description, the term "renewable energy" refers to a type of energy obtained from sources which can be naturally renewed, such as solar energy, aeolian energy, sea tide energy, natural heat, rain energy, etc.

Likewise, it is clear that the power line that brings electric current to the street lamps must not necessarily be a three-phase line like the one shown in the example of FIG. 1, but may also be a single-phase line. In such a case, the line switch 70 may transmit a safety signal on the phase wire, e.g., by using a conveyed-wave system wherein the safety signal is transmitted at a higher frequency than that of the power supply, so that it can be filtered and decoded by each post switch.

Also, the functions of the devices and electric/electronic equipment of the above-described public lighting system may be provided by one or more devices integrated with or operationally connected to one another. For example, the line switch 70, the safety system and the line communication system may be provided as a single device.

Likewise, the post switch 6 may be integrated with the lamp, so that the street lamp can be upgraded at a later time. In this way, the street lamps may initially be installed with the post switch integrated therewith; at a later time it will then be easy to add solar panels or other voltage generators to be connected to a specific lamp input.

It is then clear that the public lighting system also embraces the single components thereof, such as the street lamps, the transformer room and any devices performing the post switch and line switch functions.

In particular, the invention relates to a device for use in a street lamp, which comprises:
first means for connecting to a power grid,
second means for connecting to at least two external units, a first one of said two units being adapted to draw current and a second one of said two units being adapted to generate a potential difference,
a switch adapted to switch between
a first position, in which said first unit is connected to said power line to draw current from said power line, and
a second position, in which said second unit is connected to said power line to apply said potential difference to wires of said power line,
a communication system adapted to detect the presence of a safety signal on said power line and to switch said switch to said first position in the event that said safety signal is missing or faulty.

As aforementioned, such a system may be integrated into a lamp.

The invention claimed is:

1. A device for use in a street lamp, comprising:
a first connection to a power line grid,
second connections to at least two external units, a first unit of said at least two units being adapted to draw current and a second unit of said at least two units being adapted to generate a potential difference,
a switch adapted to switch between:
a first position, in which said first unit is connected to said power line to draw current from said power line, and
a second position, in which said second unit is connected to said power line to apply said potential difference to wires of said power line,
a communication system adapted to detect the presence of a safety signal on said power line and to switch said switch to said first position in the event that said safety signal is missing or faulty.

2. A device according claim 1, wherein said communication system is further adapted to cause said switch to disconnect said second one of said two units in the event that said safety signal is missing or faulty.

3. A device according to claim 1, wherein said safety signal is transmitted through conveyed waves, preferably in a single-phase wiring.

4. A lamp comprising at least one device according to claim 1.

5. A street lamp comprising at least one lighting device and at least one device according to claims 1.

6. A device according to claim 1, wherein said first unit comprises a lighting device, and wherein said second unit comprises a device for converting renewable energy into electric energy.

7. A device according to claim 6, wherein said switch is adapted to alternatively connecting to said power grid either said lighting device or said device for converting renewable energy into electric energy.

8. A device according to claim 1, wherein said safety signal is transmitted by a dedicated wire, preferably in a three-phase wiring.

9. A device according to claim 8, wherein said safety signal is a direct voltage signal.

10. A device according to claim 1, wherein said safety signal is further used as a synchronism signal for turning on at least one street lamp.

11. A device according to claim 10, wherein said synchronism signal is provided by a line switch.

12. A device according to claim 1, wherein said communication system is further adapted to provide bidirectional communication with a line communication system.

13. A device according to claim 12, wherein said bidirectional communication is further adapted to carry information about the state of the street lamp's components, such as the state of said first unit, or of said second unit, or of said switch.

14. A device according to claim 13, further comprising an Internet connection for connecting to a remote service center.

15. A device according to claim 12, wherein said bidirectional communication is further configured for receiving and/or transmitting information from/to remote service centers connected thereto, to provide further applications, such as video cameras, antennas, displays, meteorological detection systems.

\* \* \* \* \*